(12) United States Patent
Skog

(10) Patent No.: US 6,910,484 B1
(45) Date of Patent: Jun. 28, 2005

(54) CONSTANT PRESSURE GENERATOR

(75) Inventor: Göran Skog, Bromma (SE)

(73) Assignee: Maquet Critical Care AB, Solna (SE)

( * ) Notice: Subject to any disclaimer, the term of this patent is extended or adjusted under 35 U.S.C. 154(b) by 0 days.

(21) Appl. No.: 09/562,118

(22) Filed: May 1, 2000

(30) Foreign Application Priority Data

May 10, 1999 (SE) .................................. 9901690

(51) Int. Cl.$^7$ ............................................ A62B 00/00
(52) U.S. Cl. ......................... 128/205.18; 128/204.18; 128/205.14; 128/205.16
(58) Field of Search .................. 128/204.18, 204.26, 128/204.28, 205.13, 205.14, 205.16, 205.17, 128/205.18

(56) References Cited

U.S. PATENT DOCUMENTS

| | | | | |
|---|---|---|---|---|
| 3,137,215 A | * | 6/1964 | Taplin | 264/313 |
| 3,373,236 A | * | 3/1968 | Taplin | 264/313 |
| 3,824,902 A | | 7/1974 | Olsson | |
| 4,127,123 A | * | 11/1978 | Bird | 128/204.18 |
| 4,164,219 A | * | 8/1979 | Bird | 128/204.18 |
| 4,197,843 A | * | 4/1980 | Bird | 128/200.14 |
| 4,592,349 A | * | 6/1986 | Bird | 128/204.25 |
| 4,706,685 A | * | 11/1987 | Jones, Jr. et al. | 600/528 |
| 4,741,252 A | * | 5/1988 | Harter et al. | 92/103 |
| 4,932,401 A | * | 6/1990 | Perkins | 128/203.12 |
| 5,007,420 A | * | 4/1991 | Bird | 128/200.14 |
| 5,116,088 A | * | 5/1992 | Bird | 285/319 |
| 5,138,936 A | * | 8/1992 | Kent | 92/98 |
| 5,862,802 A | * | 1/1999 | Bird | 128/204.18 |

FOREIGN PATENT DOCUMENTS

| | | |
|---|---|---|
| DE | OS 26 49 254 | 5/1978 |
| DE | OS 29 13 423 | 10/1980 |
| DE | OS 37 12 389 | 10/1988 |
| EP | 0 557 134 | 8/1993 |
| EP | 0 744 184 | 11/1996 |
| FR | 0 266 253 | 10/1987 |
| FR | 0 279 708 | 1/1988 |
| GB | 1 453 637 | 10/1976 |
| WO | WO99/08738 | * 2/1999 ............ 128/204.18 |

OTHER PUBLICATIONS

Merriam Webster's Collegiate Dictionary 10th ed. p. 247 Definition of term "Constant".*

* cited by examiner

Primary Examiner—Henry Bennett
Assistant Examiner—Amanda Wieker
(74) Attorney, Agent, or Firm—Schiff Hardin LLP

(57) ABSTRACT

A constant pressure generator has a variable volume fluid reservoir formed by a container having fixed walls which cooperate to define a cross-sectional area of the container perpendicular to an axis that varies with location along the axis and an end wall arranged for movement along the axis to vary the volume of the reservoir and which is adapted to conform substantially to the fixed walls of the container to provide the region of variable area substantially that defined by the fixed walls. A force generator is engageable with the variable area region to exert a variable force thereon and the walls are shaped such that the area of the region varies interdependently with the exerted force as the volume varies to maintain the communicated pressure constant.

8 Claims, 3 Drawing Sheets

CONSTANT PRESSURE GENERATOR

BACKGROUND OF THE INVENTION

1. Field of the Invention

The present invention relates to a constant pressure generator and in particular to one for use within a patient breathing system to deliver a constant pressure output of breathable gas for supply to the patient.

2. Description of the Prior Art

The term "patient breathing system" is used as a generic descriptor for a ventilator, respirator, anaesthetic, or other medical system used to supply a breathing gas to a patient, together with the associated respiration circuit required to guide and control the supply of the breathing gas to the patient.

Most hospitals usually receive breathing gas necessary for the operation of patient breathing systems from central, high pressure, sources. However most patient breathing systems are designed to operate with a breathing gas at pressures of between 30 cm to 100 cm $H_2O$. Therefore any gas supplied from a central high pressure source requires a substantial pressure reduction before it can be passed to a patient. A pressure reduction also must usually be provided even when using bottled gas as the source.

Moreover, since the amount of breathing gas to be supplied to a patient through a patient breathing system needs to be accurately controlled, it is most desirable to provide a constant pressure gas supply within such a breathing systems.

Patient breathing systems are known in which a source of breathing gas is connected, usually via a valve, to a variable volume reservoir. The reservoir is subjected to a constant force that tends to reduce the volume of the reservoir as the amount of contained breathing gas reduces, to thereby maintain the gas at a known constant pressure over a more or less limited range of reservoir volumes. Gas may be removed from this constant pressure generator and supplied to the respiration circuit of the breathing system. Through careful choice of the constant force the generator can also provide an effective pressure reduction to the gas from the gas source.

A known constant pressure generator of this variable volume type is described in U.S. Pat. No. 3,824,902, which discloses a variable volume reservoir in the form of an expansion bellows. The bellows is made of a soft plastic material and positioned between two rigid plates. One plate is fixed in space while the other is mounted on a shaft for pivotal motion. The shaft is rotatable by means of an arm and spring arrangement to collapse the bellows. By suitable positioning of attachment points of the springs, together with a careful selection of the size of the springs, it is possible to maintain a constant force on the container over a limited operating range of reservoir volumes. This spring and arm arrangement, however, is relatively complex in construction and thus is expensive to manufacture.

Another constant pressure generator is disclosed in European Application 0 744 184 and has a variable volume reservoir in the form of a collapsible bellows. The walls of the bellows have a region consisting of an elastic material having an elasticity chosen to provide a constant force which causes the bellows to collapse and generate a constant pressure on breathing gas contained therein. The useful range of volume changes over which a constant pressure can be generated, however, is relatively small compared to the overall volume of the bellows. Additionally, position sensors on the bellows have to be used in association with control valves in order to ensure that gas is supplied from the reservoir only over the useful range. This also complicates the generator and together with the difficulties associated with fabricating a composite bellows also makes it expensive to construct.

A further constant pressure generator for use in a patient breathing system is described in European Application 0 557 134 and has a reservoir in the form of a collapsible bellows which is arranged inside a further chamber in a so-called "bag and bottle" arrangement. A propelling gas is connected to the further chamber via control valves which operate to control the flow of propelling gas into and out of the chamber in order to maintain a constant force on the outside of the bellows, at least during an inspiration phase of a patient's breathing cycle. The bellows tends to collapse under this force and so maintains the breathing gas contained therein at a constant pressure during the inspiration phase. In order to permit exhalation by the patient the propelling gas is removed from the further chamber, reducing the pressure therein and permitting the bellows to expand. Gas may then flow from the lungs of the patient. This bag and bottle arrangement is relatively complex in construction and operation.

SUMMARY OF THE INVENTION

It is an object of the present invention to alleviate at least some of the problems associated with the known constant pressure generators.

The above object is achieved in accordance with the principles of the present invention in a constant pressure generator having a variable volume fluid reservoir, the reservoir having an outlet for communicating fluid therein from the reservoir at a constant pressure to a location outside of the reservoir, and an arrangement for imparting the constant pressure to the fluid in the reservoir independently of the volume of the reservoir including a region of the reservoir of variable area disposed in pressure communication with the fluid in the reservoir, and a force generator engaging the variable area region to exert a variable force thereon, with the area of the region and the exerted force being interdependently variable as the volume of fluid in the reservoir varies so as to maintain the pressure of the fluid communicated from the outlet constant.

Thus, by allowing the force applied to a variable volume reservoir to change in a known manner as the volume changes, an area over which the force is transmitted to the contained fluid may be provided that varies concomitantly with the applied force to compensate for the variations in that force. In this manner a constant pressure may be maintained within the fluid independently of volume changes. Thus, the complex mechanical arrangements required in prior art devices to ensure that a constant force is maintained on the reservoir are avoided.

Preferably the force, for example a linearly varying force from a spring such as a helical spring, acts on a moveable wall, for example a rollable membrane, to urge the wall along an axis of a fixed wall container, shaped to provide a suitable variation in cross-sectional area with location along the axis. As the wall moves it conforms to the internal fixed wall dimensions to provide the surface of variable area. The internal geometry of the fixed wall container may be realized, for example in a suitable plastic material, using modern machining or molding techniques and makes possible a simple and relatively inexpensive mass production of the pressure generator.

By providing a fixed wall container having a regular, for example circular, cross-sectional area, this manufacture and the calculation of the required internal geometry is facilitated.

Alternatively, the variable force may result from the elasticity of the material from which the variable volume container is fabricated, and the container may be constructed to roll and unroll along its length in order to vary its volume, such that the area over which the variable force is transmitted to the fluid within the variable volume changes to maintain the constant pressure on that fluid.

In a second embodiment of the invention, a patient breathing system has a constant pressure generator according to the first embodiment of the invention connected thereto, arranged in gas connection to a respiration circuit of the system for the supply of a constant pressure breathing gas thereto.

DESCRIPTION OF THE PREFERRED EMBODIMENTS

Figure 1:
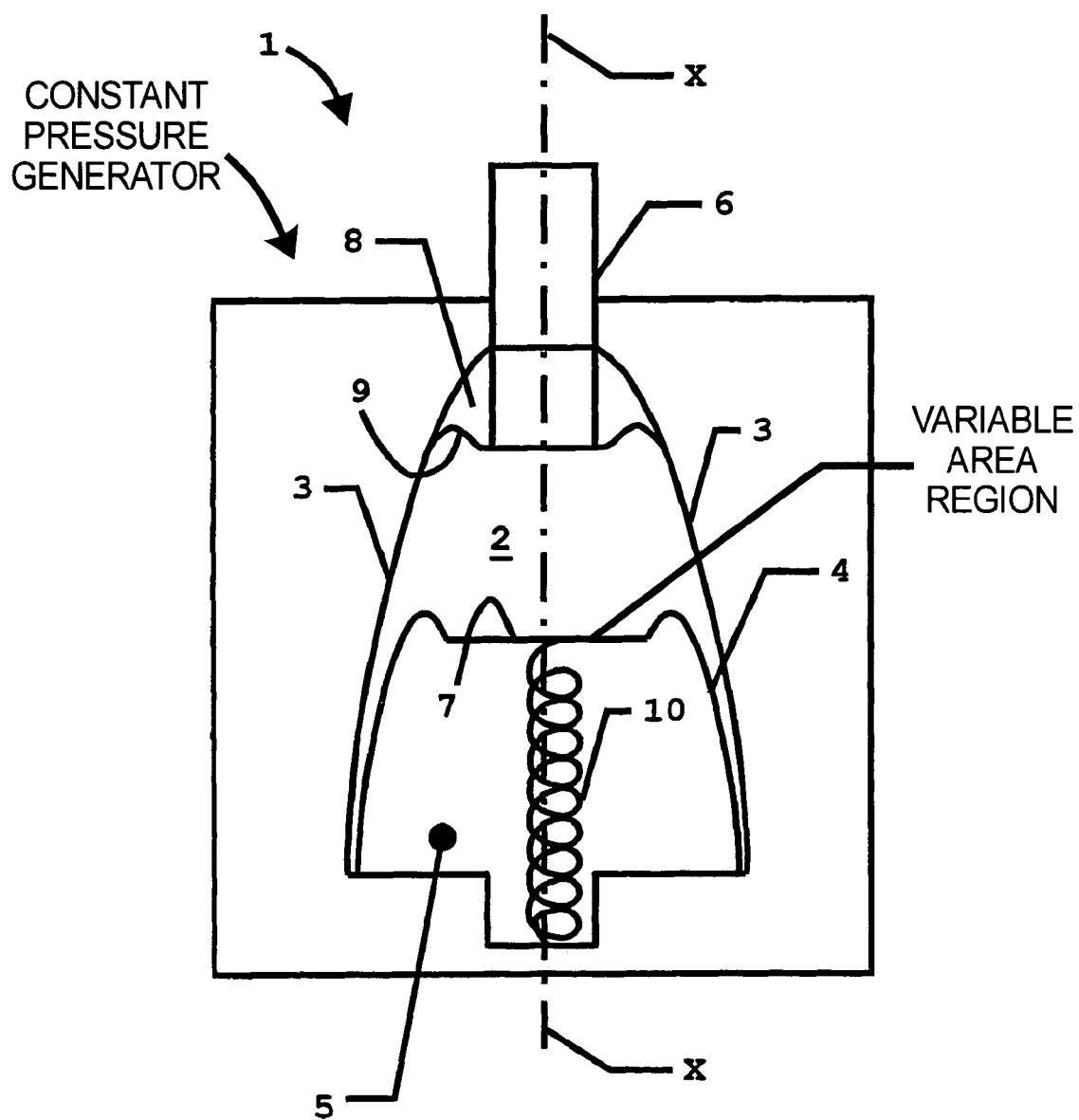
FIG. 1 is a sectional representation of a generator according to the present invention.

FIG. 1 shows a constant pressure generator 1 in cross section. A variable volume gas reservoir 2 is defined by the fixed side wall 3 and moveable end wall, here in the form of a rollable membrane 4, of a circular cross-sectioned container 5. An inlet/outlet 6 is provided in the container 5 for connecting the interior of the reservoir 2 to the exterior of the generator 1. The membrane 4 is arranged so as to be able to roll and unroll along the side walls 3 of the container 5 to vary the volume of the reservoir 2. The membrane 4 is shaped to provide a variable area surface 7 that conforms substantially to the cross-sectional area of the container 5 as it is displaced along an axis X. An end stop 8 is optionally provided within the container 5 proximate to the inlet/outlet 6. This end stop 8 has a surface 9 shaped to conform to and mate with the surface 7 at the end of travel of the membrane 4. This reduces dead space within the reservoir 2. A helically wound spring 10 is also provided for generating a variable force on the variable area surface 7 of the membrane 4. Since the spring 10 is mounted within the generator 1 so as to expand as the membrane 4 unrolls, this force decreases linearly as the area of the surface 7 decreases.

The side wall 3 of the container 5 is shaped so that within an operating range of the generator (which may be selected to be either be some or all of the total volume of the reservoir 2) the end wall 4 will form the surface 7 over which the spring force is exerted, so that a constant pressure is imparted to the fluid in the reservoir 2. The shape of the side walls 3 within the operating range therefore can be determined from a knowledge of how the applied force will vary along the axis X.

For example, when the spring 10 is extended to provide a minimum volume of the reservoir 2, the surface 7 of the rollable membrane 4 will be at one limit of its displacement along the axis X. This will be taken to be x=0, where x identifies the location of the surface 7 along the axis X. The radius of the circular cross-section of the container 5 at any location x along the axis X is designated $y_x$ (and by definition is also substantially the radius of the surface 7 of the membrane 4). The force $F_x$ exerted by the helical spring 10 on the surface 7 at any point x along the axis X is given by the known formula:

$$F_x = F_0 + c \cdot x \quad (1)$$

wherein $F_0$ is the force exerted by the spring 10 at x=0 and c is the spring constant.

The force $F_0$ exerted by the fluid within the reservoir 2 on the surface 7 is given by $$F_g = P \cdot \pi \cdot y_x^2 \quad (2)$$

wherein P is the pressure of the fluid and is equal to the desired constant pressure to be maintained in the generator 1.

At any location x of the surface 7 along the axis X in order to maintain a volume of fluid at a constant pressure P, then the force $F_g$ exerted by the fluid on the surface 7 must equal the force $F_x$ exerted by the spring 10 on that surface 7, thus:

$$F_x = F_g \quad (3)$$

From equations (1) and (2) equation (3) can be re-written as:

$$F_0 + c \cdot x = F_g = P \cdot \pi \cdot y_x^2 \quad (4)$$

Thus the radius y of the circular cross-section of the container 5 at any position x along the axis X is given by:

$$y_x = ((1/P \cdot \pi) \cdot (F_0 + c \cdot x))^{1/2} \quad (5)$$

In order to maintain a constant pressure P on a fluid in the reservoir 2 using a spring 10 arranged to provide the variable force $F_x$, the side walls 3 of the container 5 must be shaped to provide substantially the radius $y_x$ at any point x according to equation (5).

Figure 2:
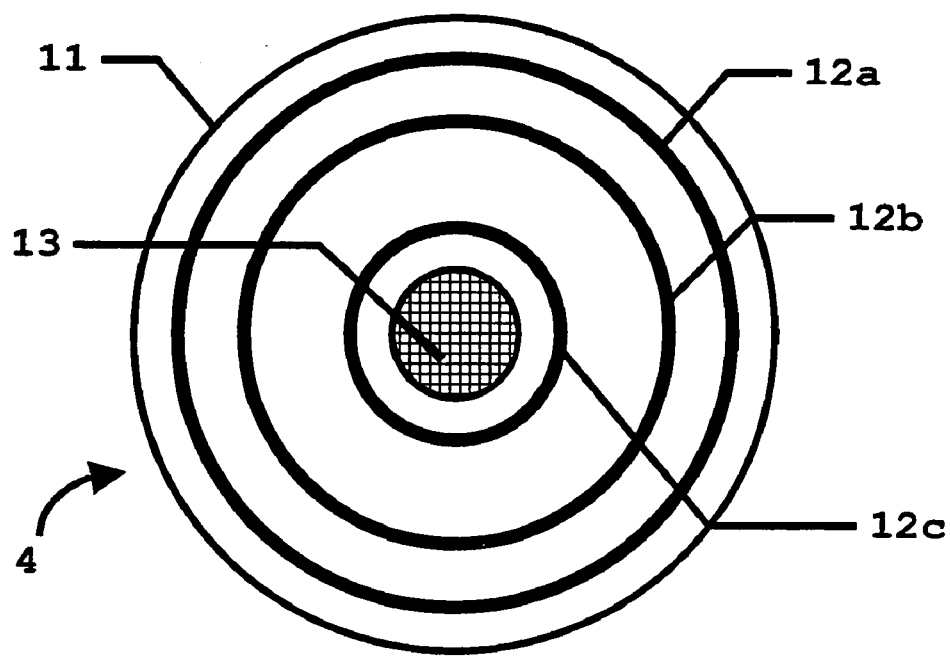
FIG. 2 shows structural details of rollable membranes useable in the embodiment of FIG. 1.

FIG. 2 shows the underside surface 11 of the membrane 4 of FIG. 1. which, when the membrane 4 is located within the container 5, contacts the spring 10. Stabilizing rings 12a, 12b, 12c are employed together with a central plate 13 in order to provide a stable upper surface 7 (see FIG. 1) and to inhibit collapse of that surface 7 in use. These rings 12a . . . c and plate 13 are formed of a relatively rigid material and are dimensioned with radii calculated according to equation (5). As the membrane 4 unrolls along the axis X each ring 12a . . . c will, in turn, engage the side wall 3 at locations x where the radius of the container 5 equals that of the corresponding ring 12a, 12b or 12c. The plate 13 will be the last to engage the walls 3 of the container 5 and effectively determines the maximum extension of the spring 10, i.e. for a maximum operating range of the generator 1 the plate 13 is sized according to equation (5) with x=0. It will be appreciated by those skilled in the art that more or fewer support rings 12 may be used, depending largely on the area 7 and inherent stiffness of the membrane 4. Furthermore a spiral arrangement having turns with radii determined according to equation (5) could easily substitute for the rings 12a . . . c of FIG. 2. Moreover, it will be understood that the rings 12a ... c, plate 13 and the spiral could be located on the upper surface 7 of the membrane 4 to achieve the same effect.

Figure 3:
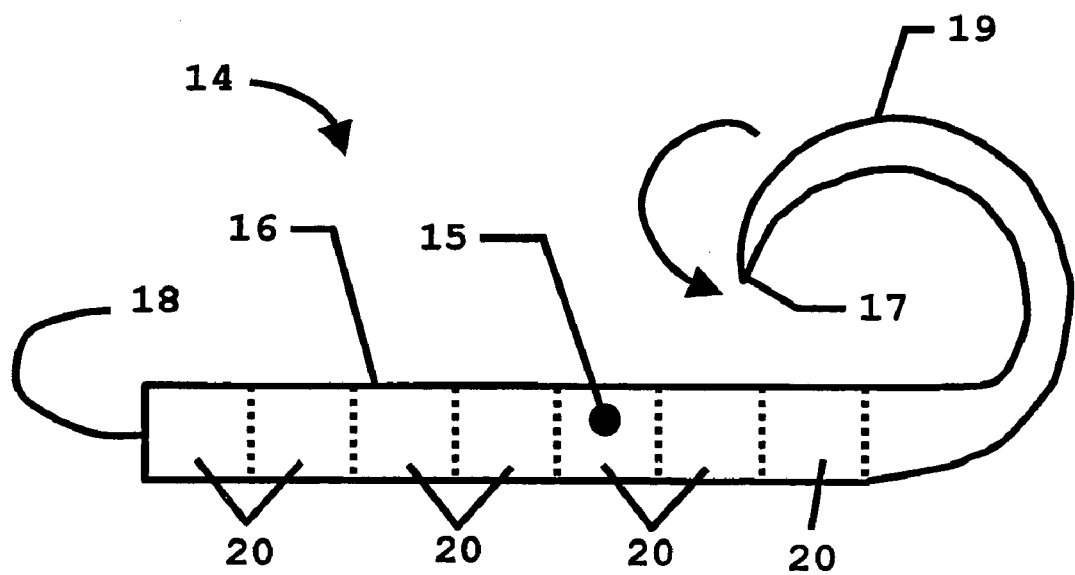
FIG. 3 shows a further embodiment of a generator according to the present invention.

A further embodiment of a generator according to the present invention is shown schematically in FIG. 3. A constant pressure generator 14 has a variable volume reservoir 15 formed by a sleeve 16 of impermeable material sealed at one end 17 and having an opposite end 18 open to provide a common fluid inlet/outlet for the reservoir 15. The sleeve 16 is constructed so as to be able to roll and unroll along its length to vary the volume of the fluid reservoir 15, for example, in a manner similar to that of a "Bourdon tube". The sleeve 16 is made of a resilient material formed so that the sleeve 16 is self-biased to tend to move a rolled portion 19 in the direction of the arrow. When inflated the gas pressure within the reservoir 15 generates a force that balances the self-bias force which is tending to reduce the reservoir volume. The reservoir 15 can be considered to have a number of identical sections 20, each having an identical bias force balanced by an identical gas pressure force (the volumes, areas and gas pressures being identical for each section 20). Thus as gas is removed from the variable volume reservoir 15 the rolled section 19 moves as indicated by the arrow to remove a section 20 from contributing to the volume of the variable volume reservoir 15. The total self bias force is similarly reduced because of the removal of this section 20. In this manner a constant pressure on the fluid within the reservoir 15 is maintained.

Figure 4:
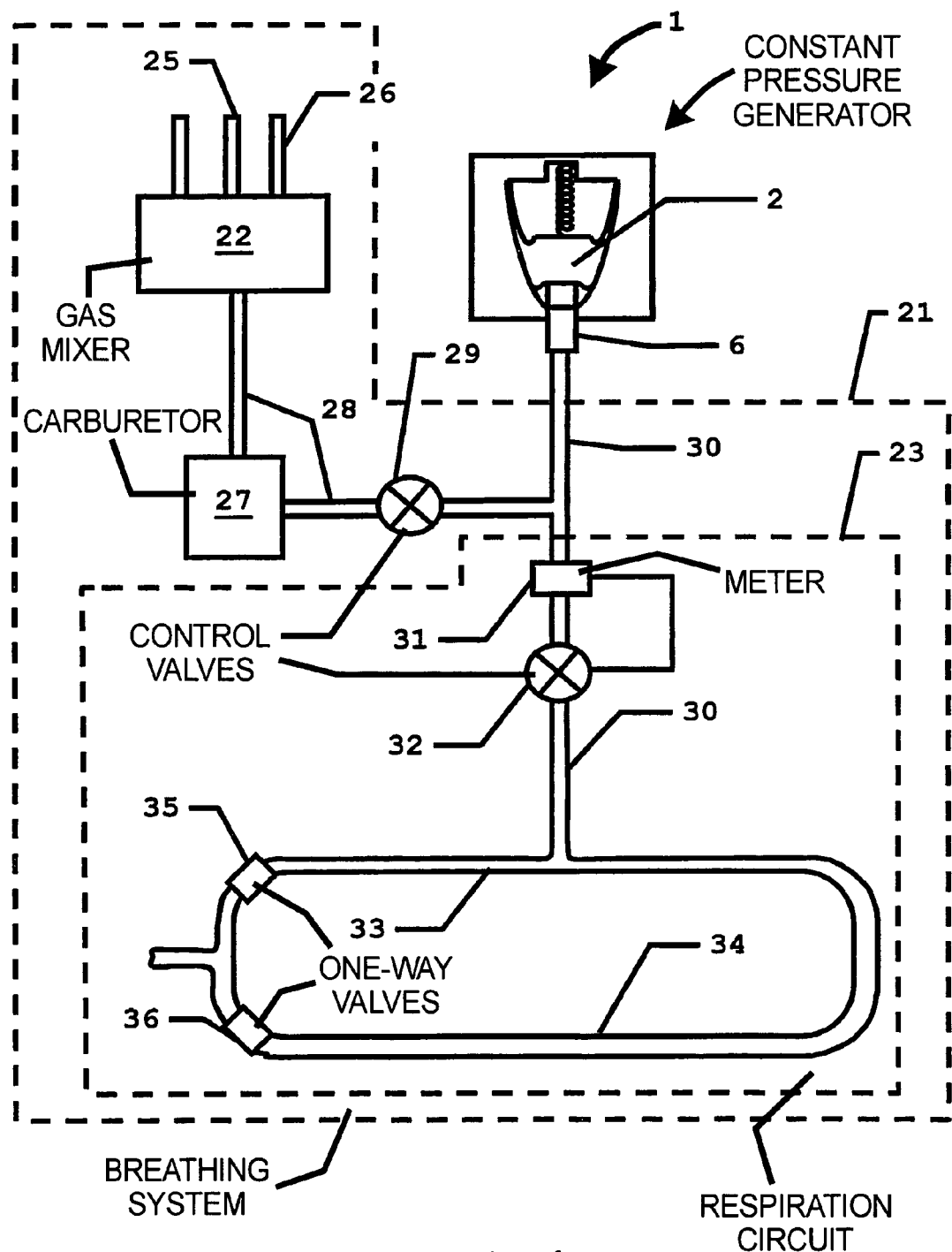
FIG. 4 shows a patient breathing system including the generator of FIG. 1.

The patient breathing system 21 of FIG. 4 has an anaesthetic gas mixer 22 and respiration circuit 23. The constant pressure generator 1 of FIG. 1 is also shown in operable connection with the breathing system 21. The gas mixer 22 is provided with gas inlets 24,25,26 through which one or more gases from a central gas system or bottle sources can be supplied to the mixer 22. For example during anaesthesia oxygen and nitrous oxide may be supplied to the mixer 22 and oxygen and air may be supplied to the mixer 22 for waking the patient. In the system 21 shown a carburetor 27 is connected to the outlet of the mixer 22 and is used to carburate an anaesthetic agent for addition to the gas mixture. A conduit 28 is provided to conduct this so formed breathing gas via a control valve 29 and the inlet 6 of the constant pressure generator 1 into the reservoir 2. Fresh breathing gas can then be conducted from the reservoir 2, via a conduit 30, through a flow meter 31 and flow control valve 32 to an inspiration line 33 of the respiration circuit 23. The directions of flow of gases in the inspiration line 33 and an expiration line 34 of the respiration circuit 23 are controlled by one way valves 35,36 that are respectively installed in the inspiration line 33 and the expiration line 34.

During a first time interval the valve 32 is closed and the valve 29 is opened to allow breathing gas from the carburetor 27 to enter the pressure generator 1 (see also FIG. 1). As the pressurized breathing gas enters the reservoir 2 through the inlet 6 the membrane 4 is forced away from the inlet 6, to increase the volume of the reservoir 2 and compress the spring 10 until, for example, the reservoir 2 is at a maximum volume or the spring force on the surface 7 of the membrane 4 balances the gas pressure force on that surface 7. During a second time interval the valve 29 is closed to shut off the gas supply from the carburetor 27 to the generator 1 and the valve 32 is opened in dependence of a flow value measured by the meter 31 to regulate flow of breathing gas from the generator 1 and supply a known quantity of fresh gas into the inspiration line 33. When the valve 32 is open, the spring 10 tends to extend to urge the surface 7 of the membrane 4 towards the inlet 6. A constant pressure gas output therefore is provided from the outlet 6 in a manner described above with regard to FIG. 1.

Although described with reference to the constant pressure generator 1 of FIG. 1, the generator 14 of FIG. 3 can readily be substituted to supply the constant pressure gas to the breathing system 21 of FIG. 4. Moreover, it will be appreciated that generators 1 and 14 according to the present invention are not limited to use only in connection with anaesthetic systems but can, of course, also be used in connection with respirators or ventilators or other breathing systems used to provide breathing gas to a patient.

Although modifications and changes may be suggested by those skilled in the art, it is the intention of the inventor to embody within the patent warranted hereon all changes and modifications as reasonably and properly come within the scope of his contribution to the art.

I claim as my invention:

1. A constant pressure generator comprising:
    a variable volume fluid reservoir containing a fluid;
    an outlet from said reservoir for communicating said fluid from said reservoir at a constant pressure to a location outside of said reservoir; and
    an arrangement for producing said constant pressure comprising a portion of said reservoir having a variable area with a variable size disposed in pressure communication with said fluid in said reservoir, and a passive force generator engaging said variable area and having a natural, inherent, non-energized tendency for exerting a variable force on said variable area, with said size of said variable area and said force being interdependently variable as a volume of said reservoir varies to maintain the pressure of the fluid from said outlet constant independent of the volume of the reservoir.

2. A constant pressure generator as claimed in claim 1 wherein said reservoir comprises a container having fixed walls and an end wall which define the volume of the reservoir, said end wall being movable along an axis to vary the volume of the reservoir and being adapted to substantially conform to a shape of said fixed walls as said end wall moves along said axis to produce said region of variable area.

3. A constant pressure generator as claimed in claim 2 wherein said end wall comprises a rollable membrane which rolls and unrolls along said axis.

4. A constant pressure generator as claimed in claim 2 wherein said passive force generator generates a force which varies linearly with a location of said variable area region along said axis.

5. A constant pressure generator as claimed in claim 4 wherein said passive force generator comprises a spring which produces a spring force on said variable area region in a direction parallel to said axis.

6. A constant pressure generator as claimed in claim 2 wherein said fixed walls define a circular cross-section of said container.

7. A constant pressure generator as claimed in claim 6 wherein said circular cross-section decreases with increasing distance along said axis from an initial position of said end wall.

8. A patient breathing system comprising:
    a respiration circuit;
    a source of pressurized breathing gas;
    a constant pressure generator in gaseous communication with said source of pressurized breathing gas and with said respiration circuit to provide breathing gas to said respiration circuit at a constant pressure; and said constant pressure generator comprising a variable volume fluid reservoir containing a fluid, an outlet from said reservoir for communicating said fluid from said reservoir at a constant pressure to said respiration circuit, and an arrangement for producing said constant pressure comprising a portion of said reservoir having a variable area with a variable size disposed in pressure communication with said fluid in said reservoir, and a passive force generator engaging said variable area and having a natural, inherent, non-energized tendency for exerting a variable force on said variable area, with said size of said variable area and said force being interdependently variable as a volume of said reservoir varies to maintain the pressure of the fluid from said outlet constant independent of the volume of the reservoir.

* * * * *